United States Patent [19]

Mandy

[11] Patent Number: 5,412,542
[45] Date of Patent: May 2, 1995

[54] DOWN LIGHTING SYSTEMS AND FIXTURES THEREFOR

[75] Inventor: Robert R. Mandy, Bingham Farms, Mich.

[73] Assignee: Man-D-Tec, Inc., Scottsdale, Ariz.

[21] Appl. No.: 122,899

[22] Filed: Sep. 16, 1993

Related U.S. Application Data

[60] Division of Ser. No. 940,672, Sep. 4, 1992, which is a continuation-in-part of Ser. No. 672,415, Mar. 20, 1991, Pat. No. 5,145,247.

[51] Int. Cl.⁶ ............................................. F21V 33/00
[52] U.S. Cl. ................................. 362/20; 362/76; 362/84; 362/85; 362/148; 362/237; 187/390; 187/414; 340/333; 340/693
[58] Field of Search ............... 340/333, 641, 642, 693; 187/1 R, 130, 139, 140; 362/20, 23, 24, 26, 27, 34, 76, 84, 276, 800, 802, 85, 148, 23.5, 237; 116/68, 202

[56] References Cited

U.S. PATENT DOCUMENTS

| | | | |
|---|---|---|---|
| 3,069,509 | 12/1962 | Sherron | 362/24 |
| 3,336,473 | 8/1967 | Buzan | 362/20 |
| 3,384,886 | 5/1968 | Serra | 340/333 |
| 3,739,226 | 6/1973 | Seiter et al. | 362/20 |
| 3,746,877 | 7/1973 | Seiter et al. | 340/333 |
| 3,955,183 | 5/1976 | McBrian | 340/693 |
| 4,179,594 | 12/1979 | Coyle et al. | 116/202 |
| 4,514,789 | 4/1985 | Jester | 362/20 |
| 4,678,062 | 7/1987 | Sumka | 187/130 |
| 4,708,223 | 11/1987 | Orndorff et al. | 362/20 |
| 4,977,353 | 12/1990 | Helal et al. | 307/66 |
| 5,145,247 | 9/1992 | Mandy | 362/20 |

FOREIGN PATENT DOCUMENTS

| | | | |
|---|---|---|---|
| 3003974 | 8/1981 | Germany | 362/24 |
| 4-20487 | 5/1990 | Japan | 187/1 R |

Primary Examiner—Ira S. Lazarus
Assistant Examiner—Alan B. Cariaso
Attorney, Agent, or Firm—Reising, Ethington, Barnard, Perry & Milton

[57] ABSTRACT

An emergency illumination device for elevator cabs and the like that includes a low voltage power source defined by the secondary winding of a stepdown transformer having its primary winding connected across a primary power source. When the primary power source is "on", a charging circuit maintains a constant charge on an emergency battery source while providing battery source power to an emergency alarm device that can be activated by a push button on the control panel of the elevator. When the primary power is off, the emergency battery source is activated by a circuit that will continue to provide power to the alarm device and also will provide general illumination to the interior of the elevator and spot illuminate the push button so that it can be easily located and operated by occupants in need of assistance.

11 Claims, 4 Drawing Sheets

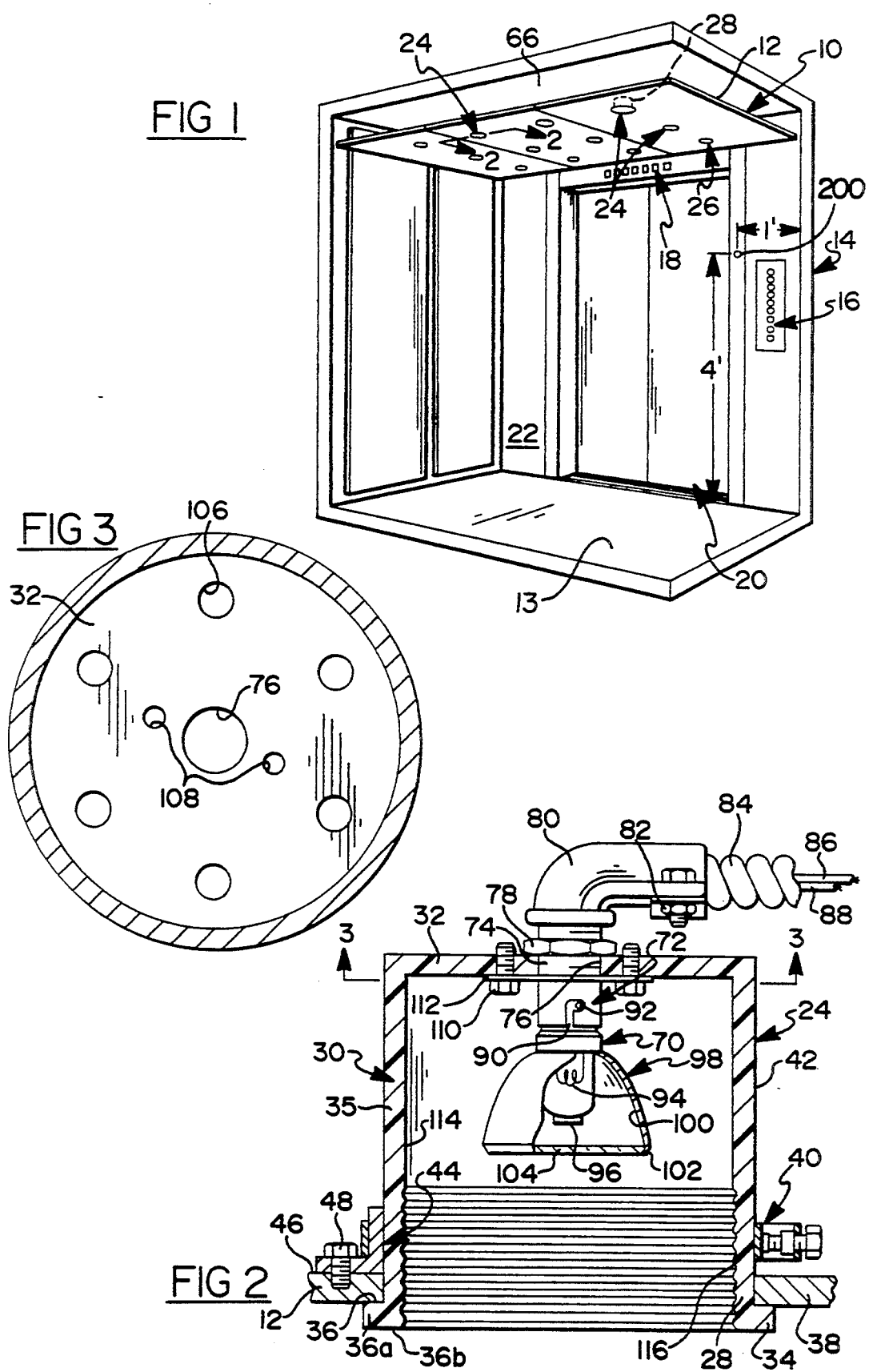

DOWN LIGHTING SYSTEMS AND FIXTURES THEREFOR

This is a divisional application of U.S. Ser. No. 07/940,672, filed Sep. 4, 1992, which is a continuation-in-part application of U.S. Ser. No. 07/672,415, filed Mar. 20, 1991, now U.S. Pat. No. 5,145,247, issued Sep. 8, 1992.

BACKGROUND OF THE INVENTION

This invention relates to lighting systems.

An example of such present systems is set-forth in U.S. Pat. No. 4,708,223 issued Nov. 24, 1987 wherein an emergency light is located in an elevator cab to meet the standards. The emergency light, however, is not mounted on the control panel. Additionally, it is located on a plate that conceals the emergency light to prevent tampering until the main power fails. In order to operate under emergency operating conditions the emergency light is associated with an electric solenoid that will position the emergency light for operation when the power fails. There is no provision for a separate light to spot illuminate an alarm device on the control panel.

SUMMARY OF THE INVENTION

Accordingly, an object of my invention is to provide a one piece, down lighting fixture which will provide direct focused lighting on an emergency signaling device located on a control panel in an elevator cab.

A further object of the invention is to provide a lighting device in addition to an emergency light for illuminating the elevator cab and wherein the lighting device is separate from the emergency light and arranged to attract attention to an emergency signalling device that is located on the control panel in an elevator cab, thus enabling an occupant to locate and operate an emergency signalling device such as a push alarm button and/or emergency cab phone located in the elevator cab for calling for help in the event of a primary power failure.

Another object of the present invention is to provide an alarm lighting device that is a separate light that spot illuminates an emergency alarm button or indicia associated with an emergency alarm button and wherein the alarm lighting device provides lighting in addition that of lighting from an emergency lighting source for allowing occupants in need of assistance to easily locate and determine options available to them instead of relying solely on emergency illumination provided from a emergency lighting device that provides general cab illumination during a primary power loss in an elevator.

A feature of the present invention is to provide for such alarm lighting by the provision of a long life, low current device either in an alarm button or behind a translucent alarm button whereby under conditions in which the main power fails, a battery power source is connected to energize both an emergency bulb or bulbs for providing general cab illumination and in addition is connected to energize the long life, low current device to illuminate the alarm button so there is no mistaking its location.

Yet another feature of the present invention is to provide an alarm lighting arrangement as set-forth in the preceding paragraph wherein the low current device is either a light emitting diode that is constantly illuminated or a light emitting diode that is of the blinking or flashing type.

Still another feature of the present invention is to provide such an alarm lighting arrangement on or in the vicinity of the elevator cab telephone cover behind or in an indicator button.

A still further feature is to provide such an alarm lighting arrangement in which the emergency phone is a speaker phone that is actuated by the illuminated button to automatically dial the phone or to connect the phone for direct communication with an emergency provider without dialing the phone.

The emergency lighting circuit means includes a battery defining a rechargeable d.c. power source for emergency power, a battery charger having input terminals connected to the primary power source and outlet terminals for supplying charging current to the battery.

A double pole, double throw relay has a first pair of contacts and a second pair of contacts. A solenoid controlled armature is operatively connected to the first and second pairs of contacts. It is energized by the primary power source and positions the first pair of contacts to supply charging current to said battery as long as the primary power source is on. When the primary source of power fails, the solenoid positions the second pair of contacts to connect the battery to the second socket means so as to energize lamp means therein to provide emergency lighting. The emergency lighting includes a light or lights for providing general emergency illumination of the control panel region of the elevator cab and further includes an alarm lighting arrangement with an illumination device for focusing light specifically on an alarm device.

A manually operative test button on the armature provides the means for manually disconnecting the first pair of contacts and connecting the second pair of contacts to connect the emergency lamp means to the battery to test emergency lighting when the primary power source is operative.

The previous embodiments of the invention can include three (3) emergency bulbs having focusing lens on the ends of the bulbs to provide a low level of illumination, viz. 0.2 foot candles minimum, under emergency lighting conditions. The light level is selected to enable an occupant of the elevator to locate and operate the push alarm button and/or the emergency cab phone located in the elevator in order to call for help.

A preferred embodiment of the invention includes providing a long life, low current device for illumination, e.g. a light emitting diode or L.E.D. and locating the L.E.D. behind or in a translucent "alarm" button. Thus, under conditions in which the main power fails a battery power source is connected to both the emergency bulbs and the L.E.D. to illuminate the alarm button so that there is no mistaking its location. To attract even more attention the low current device can be of the flashing or blinking type.

A preferred embodiment of the invention includes providing an alarm device illumination device separate from the general emergency illuminating bulbs, lamps or lights that is located on or in the vicinity of the emergency cab telephone cover behind or in an indicator button located on or in the vicinity of the telephone cover. In cases where the emergency phone is replaced by a speaker phone the illumination source can be located in the button which is operated to automatically dial the phone or push it to directly talk without dialing.

Other objects, features and advantages of the present invention will be readily appreciated as they become better understood with reference to the following description when considered in conjunction with the accompanying drawings wherein:

BRIEF DESCRIPTION OF THE DRAWINGS

FIG. 1 is a perspective view showing an elevator cab including an overhead lighting system in accordance with the present invention;

FIG. 2 is an enlarged sectional view taken along the line 2—2 of FIG. 1 looking in the direction of the arrows;

FIG. 3 is a vertical sectional view taken along the line 3—3 of FIG. 2 looking in the direction of the arrows with the light bulb socket removed;

DETAILED DESCRIPTION OF THE PREFERRED EMBODIMENTS

Figure 4:
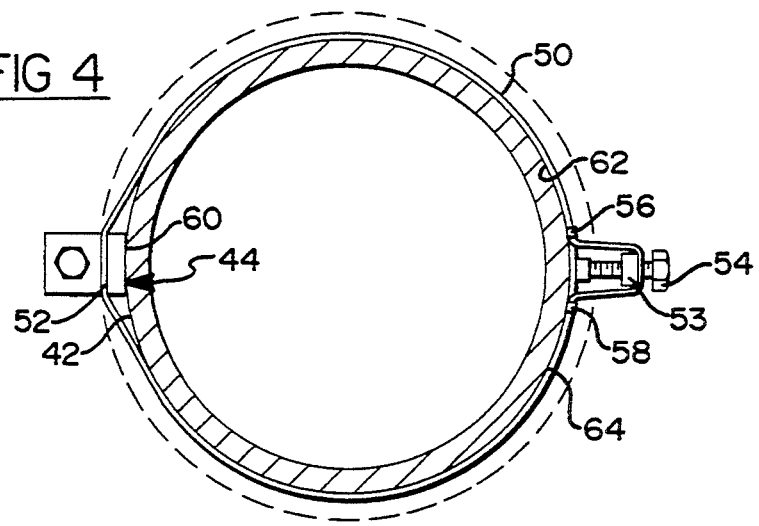
FIG. 4 is a fragmentary sectional view taken along the line 4—4 of FIG. 2 looking in the direction of the arrows.

Referring now to FIG. 1, the down lighting system 10 of the present invention is shown in association with a ceiling 12 in an elevator cab 14 which has two walls thereof broken away for clarity.

The elevator cab 14 has a control panel 16 and floor indicator lights 18 of a known kind, as well as a pair of sliding doors 20. The interior space 22 of the elevator cab 14 is illuminated by a plurality of main (sometimes called a primary source of illumination) light fixtures 24 one of which 26 provides main and emergency lighting (sometimes called a secondary source of illumination).

As shown in FIG. 2, each of the main light fixtures 24 (and 26) are supported on the ceiling 12 at access holes 28 therein.

More particularly, each of the main light fixtures 24 (and 26) includes a housing 30 having a closed end 32 and a flanged open end 34 joined respectively to an intermediate tubular portion 35.

The flanged open end 34 has an outer diameter 36a which overlies the access hole 28 and which further defines a retention surface 36 that engages the outer surface 38 of the ceiling 12 to lock the housing 30 against further inboard movement with respect to the ceiling 12.

In accordance with certain principles of my invention, the housing 30 is held in place on the ceiling 12 by a retainer assembly 40 of a form that can be adjustably positioned along its vertical surface 42 so as to enable the housing 30 to be universally adapted for mounting on a number of different ceiling thicknesses as will be discussed. The retainer assembly 40 more particularly includes a single L shaped retainer 44 with a lower leg that is connected to the inner surface 46 of ceiling 12 by a single fastener 48, representatively shown as a screw element. The upper leg of the L shaped retainer 44 is in close proximity to the access hole 28 and extends vertically upwardly of the surface 42. Consequently, it is positioned to engage a diametric point 52 on the outer surface 42 of the housing 30 as shown in FIG. 4.

The retainer assembly 40 also includes an annular clamp 50 which wraps around the full circumference of the outer surface 42 and against the outboard surface 52 of the upper leg of the L shaped retainer 44. It includes a tensioning nut 53 which is positioned to be drawn outwardly by a screw element 54 so as to draw end segments 56, 58 of the annular clamp together. As the clamp is tightened, the inboard surface 60 of the upper leg 44 is forced against the outer surface 42. Simultaneously, the clamp 50 applies hoop pressure between the inner surface 62 of the annular clamp 50 and the diametrically opposite surface segment 64 of the outer surface 42 of the housing 30 as shown in FIG. 4. Retainer assembly 40 is thereby readily adjustable along different points on the height of the outer surface 42 of the housing 30 so as to be adjustable to different height or thickness ceilings 12. Consequently, the housing 30 is a universal housing suitable for a wide range of different ceiling applications. Furthermore, the arrangement enables such a universal housing configuration to be firmly clamped between the retention surface 36 and the retainer assembly 40 so that the assembled main light fixture 24 will not rotate with respect to the ceiling 12 during bulb replacement and following connection of a wiring system thereto such that the finally assembled fixture and bulbs mounted thereon will withstand dynamic test conditions for elevator operation without damage or dislodgement from the ceiling 12.

The arrangement enables individual fixtures to be quickly assembled and placed on the ceiling 12. Furthermore, the retainer assembly 40 is of low cost while providing a desired structural integrity between the main light fixture 24 and the ceiling 12.

A further feature of the main lamp fixture 24 is that it can be located in low clearance plenum spaces such as illustrated by reference numeral 66 in FIG. 1. More particularly, the housing 30 is configured so that only a reduced plenum height clearance is required to accommodate a high efficiency lamp source such as the halogen lamp assembly 70 of fixture 24. The halogen lamp assembly 70 is shown mounted in a socket 72 connected to the closed end 32 of the main light fixture 24.

More particularly, the conduit fitting 80 has a threaded end 74 thereon which is threadably received in an internally threaded bore 76 through the closed end 32. The threaded end 74 is locked to the outer surface of the closed end by a lock nut 78. The conduit fitting 80 has the opposite end thereof secured by a clamp assembly 82 to one end of a flexible conduit 84. The conduit 84 has wires 86, 88 directed therethrough to supply 12 volt power to the power contacts on the socket 72. Thus, the flexible conduit 84 is connected to the lamp housing 30 so that wiring thereto will not be separated or dislodged during elevator operation or replacement of bulbs in the fixture 24. In areas where electrical code does not require wire protection, the conduit 84 and conduit fitting 80 may be deleted. Further, the socket 72 may be mounted as shown in FIG. 2 or mounted on the top surface of closed end 32.

The socket 72 has a double contact bayonet connector into which the base 90 of the halogen lamp assembly 70 can be inserted and rotated to locate the retention pins 92 thereof in place and complete the electrical contact of the filament 94 of a halogen bulb 96 to the wires 86, 88. The halogen lamp assembly 70 further includes a reflector 98 that will focus the light from the filament 94 in a downward direction through the open end of the housing 30. The reflector 98 includes a bright inner surface 100 and has a spun over end 102 that captures a protective lens 104 which is secured on the end of the reflector 98 to keep the inner surface 100 clean. The lens 104 also prevents broken bulb fragments from falling into the elevator to meet protection requirements for down lighting systems of the type used in elevators.

The housing 30 has a plurality of air cooling holes 106 formed in the closed end 32 as shown in FIG. 3. The closed end also includes holes 108 to receive screws 110 for holding the mounting flange 112 of the socket 72 in place on the closed end 32.

In a preferred embodiment, the housing 30 can be a single piece casting to define a strong base for the fixture 24. The flanged open end 34 can be machined on the retention surface 36 and on the circumferential surface 36a and outer surface 36b for a finished appearance. The inside surface 114 of the housing 30 can be machined smooth to provide a polished appearance or, alternatively, as illustrated, it can be threaded through a segment 116 thereof to provide light rings for a diffused appearance when looking up into the cavity of the housing 30.

The closed end 32, in the illustrated arrangement, has six ventilating holes 106, which are provided to keep the bulb temperature within desired operating levels. In the illustrated arrangement, holes are configured to provide suitable ventilation for a 20 watt halogen bulb 96.

The closed end 32 has a large central hole 76 machined therein for the bulb socket 72. The socket bracket 112 can be either screwed or riveted in place. The resultant structure provides a strong, movement resistant base into which bulbs can be changed without popping out the socket. The inside diameter of housing 30 is large enough to provide for easy replacement of the halogen lamp assembly 70 into and out of the closed end 32. Furthermore, the wires for the main light fixture 24 exit out the end wall 32 for connection to a suitable power supply.

The central hole 76 can be threaded if flexible conduit is desired to cooperate with the lock nut 78 to securely fasten the conduit fitting 80 in place to further provide a strong base which will not vibrate loose during elevator operation and which will enable bulbs to be connected and disconnected without affecting the wire connection to the socket 72.

Figure 5:
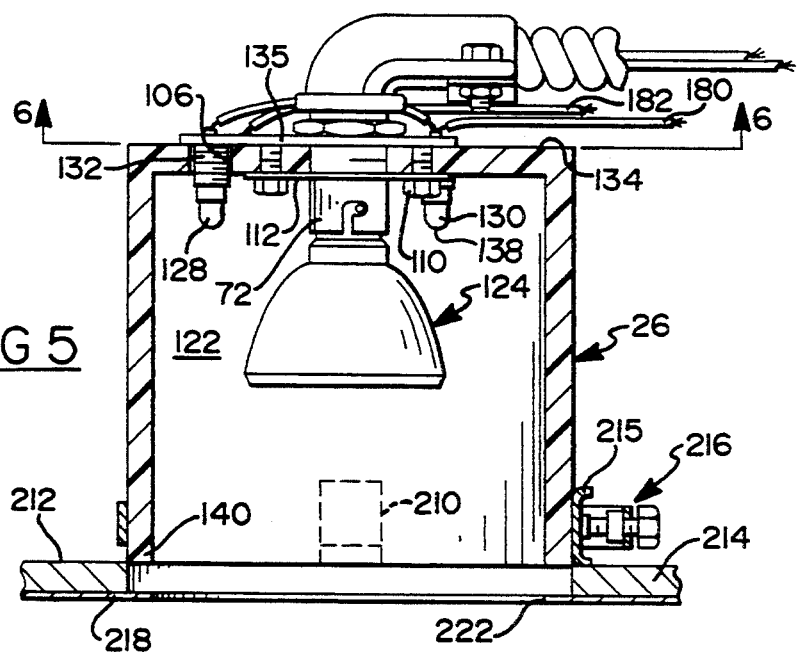
FIG. 5 is a diagrammatic view of an emergency lighting fixture in accordance with the present invention.

A further aspect of the present invention is illustrated in FIG. 5, which shows a combined fixture 26 for main and emergency lighting. The combined fixture 26 is essentially the same as the lamp fixture 24 in FIG. 2 but with the addition of an emergency bulb and socket assembly 120 formed in a side space 122 around a halogen lamp assembly 124.

Figure 6:
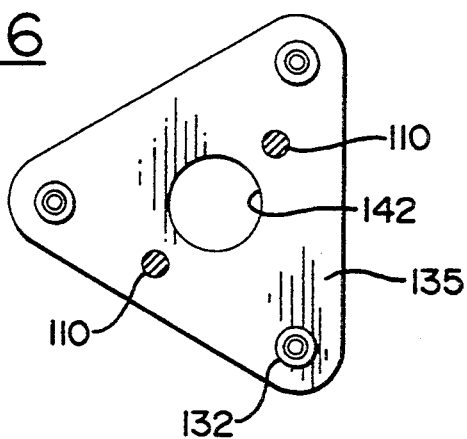
FIG. 6 is a sectional view of an emergency bulb and socket assembly taken along the line 6—6 of FIG. 5.

A combined fixture 26 is mountable in ceiling 12 through access opening 28 therein in the same manner as discussed with reference to the lighting unit 24. In the illustrated arrangement, the only difference is the addition of two (or more) dedicated emergency light bulbs 126, 128, 130 which have sockets 132 fixed to a mounting plate 135. The mounting plate 135 is fixed to the outer surface 134 of the closed end of the fixture by means of two screws 110 that are used for holding the mounting flange 112 of the socket 72 for the halogen bulb. The emergency bulbs 126, 128, 130 are thus located in two of the vent holes 106 and allows the lens end 138 of bulbs 128, 130 to direct light energy downwardly through the open end 140 of the fixture 26. FIG. 6 shows the mounting plate 135 with three sockets 132 and an opening 142 for the socket 72.

Figure 7:
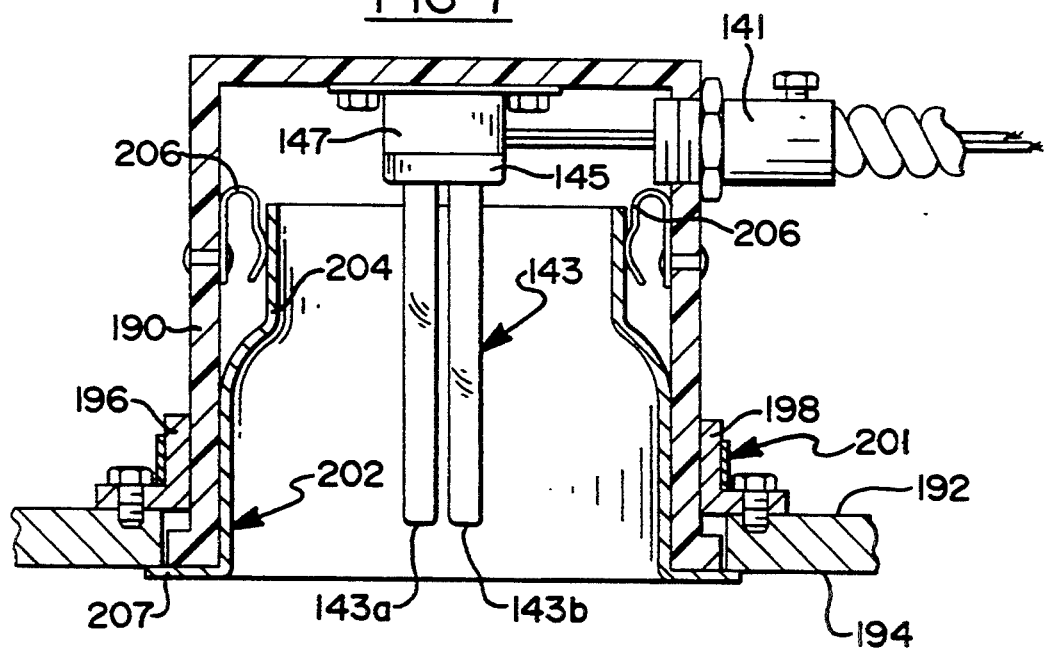
FIG. 7 is another embodiment of the light fixture of the present invention.

FIG. 7 shows another embodiment of the invention in which the fixture housing remains the same but has a side conduit fitting 141. In this embodiment, the primary light source is a single ended fluorescent bulb 143 having its base 145 connected to a socket 147 in the closed end of a fixture housing corresponding to those previously discussed. The bulb 143 is shown as a dual unit (quad units could also be used) which has two ends 143a, 143b for directing down lighting through the open end of the fixture. An advantage of the embodiment is provided by a reduced lateral dimension which results in more space for an emergency bulb and socket assembly of the type shown at 120 in FIG. 5.

FIG. 7 illustrates an alternative mounting arrangement which locates a housing 190 on the inner surface 192 of a ceiling 194. The housing 190 is stabilized by two diametrically spaced L-brackets 196, 198 which are clamped to the housing 190 by a clamp 201 of the same configuration as clamp 50 in the FIG. 2 embodiment. Another feature of this mounting configuration is that it enables a trim bezel 202 to be inserted in the open end of housing 190 to provide a thin, finished exterior appearance. The trim bezel 202 has a small diameter tubular extension 204 held in place in the interior of the housing 190 by a plurality of spaced spring clips 206. This arrangement reduces the light aperture for aesthetic reasons and provides a flange 207 for covering the ceiling hole. It also enables the bezel to be removed for replacing the bulb.

FIG. 5 shows a third mounting arrangement. In this case, the open end 140 of the housing is clamped by diametrically spaced brackets 210 (one shown in dotted line) that are fastened by suitable means to the inner surface 212 of the ceiling 214. The reaction plate 215 of a clamp 216 also engages the inner surface 212 and forms a third point for stabilizing the fixtures 26 on top of the ceiling 214. The ceiling 214 has a thin metal sheet 218 which has an edge that extends beyond a centerline 220 in the ceiling 214 to shield the open end 208. The sheet 218 has a hole 222 forming a light aperture for the fixture 26.

Figure 8:
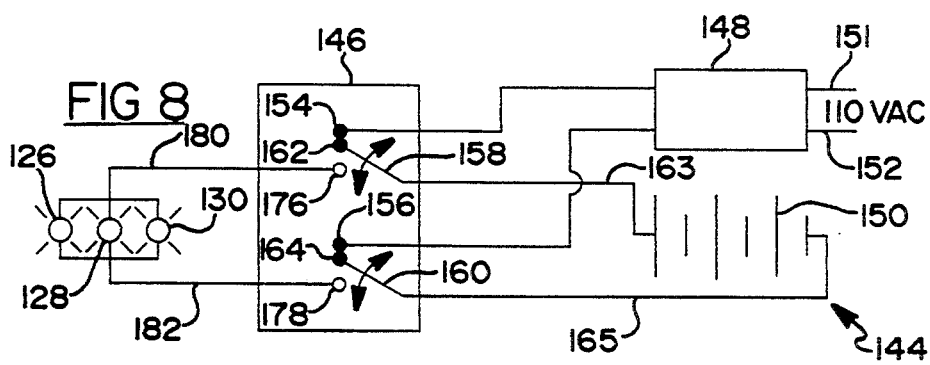
FIG. 8 is a diagrammatic view of an emergency lighting circuit and controller in accordance with my invention.

As shown in FIG. 8, the emergency light portion of fixture 26 is associated with an emergency lighting circuit 144. The emergency lighting circuit 144 includes a double pole, double throw relay 146 that selectively connects a battery charger 148 to either charge a gel cell (or cadmium nickel), rechargeable, direct current battery 150 or to connect the battery 150 to the emergency light bulbs 128, 130.

Figure 8A:
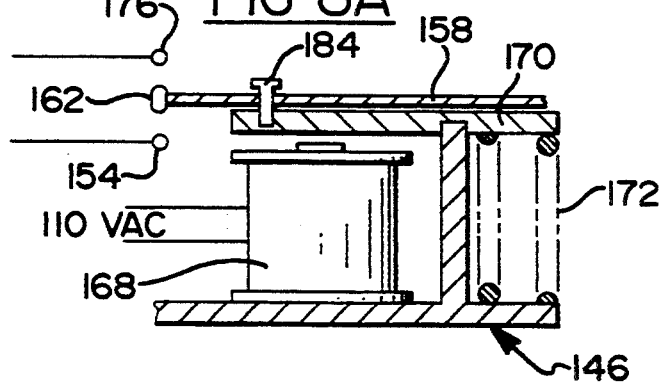
FIG. 8A is a diagrammatic view of a relay coil.

More particularly, the battery charger 148 has its input terminals connected to wires 150, 152 of a 110 volt power supply. The output terminals are connected to contacts 154, 156 which are electrically connected (by means of movable contact carriers 158, 160 when a coil 168 is energized) to contacts 162, 164 connected to conductors 163, 165, respectively for providing a charging circuit between the anode and cathode terminals of the battery 150. The charging circuit is controlled by relay coil 168 (FIG. 8A) that is connected across the 110 volt power supply to displace an armature 170 in a direction to close the contacts 154, 156. In cases where the 110 volt supply fails, the coil 168 is deenergized and the armature is returned by a spring 172 in a direction to open the contacts 158, 160 and to close normally open contacts 176, 178. The normally open contacts 176, 178, when closed, complete an emergency lighting circuit from the conductors 163, 165 through conductors 180, 182 to opposite sides of the emergency light bulbs 126, 128, 130.

A feature of the present invention is that the armature 170 is directly connected to a test button 184 which can be pulled to overcome the force of the coil 168 and directly open the contacts 154, 156 to complete the battery lighting circuit across the lamps 126, 128, 130 during periods when the main power is on and when it is desired to test the emergency lighting.

Combined fixture 26 can be mounted on the ceiling 12 in a location with respect to an emergency test point represented by reference numeral 200 in FIG. 1. The test point is located one foot from the wall of the elevator with the control panel 16 and four feet from the floor 13. In order to meet test point candle power requirements, combined light fixture 26 is located on the ceiling closely adjacent and vertically above the test point 200. It has been found that the dedicated bulbs in fixture 26 provides sufficient illumination at the test point 200 to meet emergency candle power requirements in a space 22 when the main power has failed.

The provision of dedicated bulbs for emergency lighting in a common main lighting fixture housing enables the emergency lighting to be provided in the down lighting system without requiring extra fixture or lens costs. The dedicated bulbs are used on a standby basis and are not used for normal illumination and, therefore, are not subject to burn out. When the main power fails, all emergency lights are connected to the battery source and are concentrated in one spot directly over the test point. They are arranged to illuminate the test point in an unobstructed manner without requiring that the emergency light bend around baffles or other obstructions heretofore used to partially conceal emergency light bulb configurations.

Both the illuminating and emergency bulbs can be changed in the combination light fixture 26 without removing lenses or removing ceiling segments or use of a ladder.

If desired, a test switch could be placed in series with the relay coil and the test switch could be operated to simulate a power failure to see if the emergency lighting is standby ready. However, the installation of the pull rod on the armature accomplishes the same objective but is less expensive than a separate switch.

Figure 9:
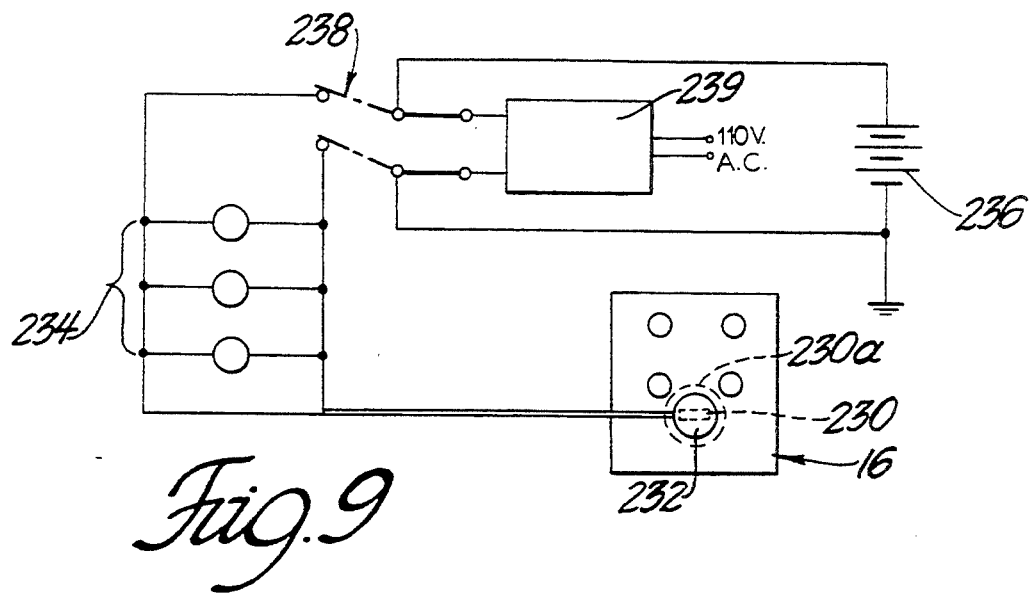
FIG. 9 is a schematic view of an emergency lighting circuit including another embodiment of the invention.

As described above, emergency lights with three lens end bulbs provide a limited low level illumination for lighting an emergency push button on the control panel 16. In order to enhance the emergency lighting arrangement in the embodiment of FIG. 9 a light emitting diode (LED) 230 is located on the control panel 16 behind an alarm button 232 to illuminate when power failure occurs. To accomplish this purpose, the LED 230 is connected in parallel with three emergency lights 234 that are selectively connected to an emergency battery 236 by a control relay 238 corresponding to relay 146 in FIG. 8. During normal operation the 110 volt supply is connected by the control relay 238 to a charger 239 for charging the emergency battery 236. Thus, when there is a 110 volt power supply failure, the LED will illuminate the alarm button 232. If desired, the LED can be of the blinking or flashing type to attract more attention than a constantly illuminated emergency push button. Alternatively, the LED can be replaced by a passive phosphorescent ring 230a shown in dotted line in FIG. 9. The ring 230a is made from a known phosphorescent material such as halophosphated phosphors, strontium phosphors and radium. Such materials produce light when exposed to normal lighting conditions and continue to glow in the dark following excitation. In this case, on failure of the 110 volt supply, the elevator is dark. The passive ring 230a will glow to illuminate the alarm button 232.

Figure 10:
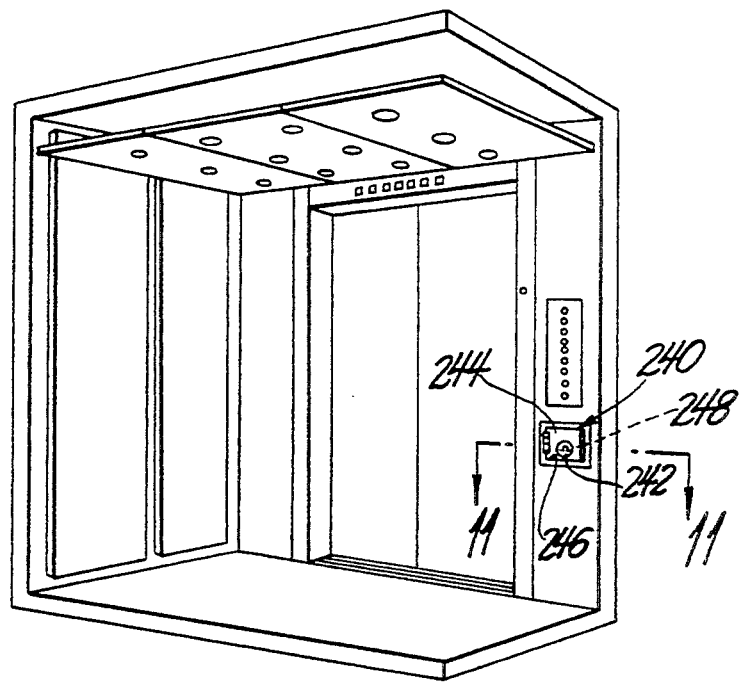
FIG. 10 is a diagrammatic view of still another embodiment of the invention.

Another embodiment of the invention is shown in FIG. 10 which illustrates a typical telephone box 240. The telephone box 240 has an indicator button 242 on its face with a universal symbol of a telephone. The box 240 has a door 244 for covering an access opening 246 to a telephone which is directly wired to a emergency service. In the past such arrangements have exposed the telephone to vandalism or theft. In accordance with the present invention the button 242 is illuminated by an LED 248 wired in parallel with the LED of FIG. 9. Such light source on the emergency cab telephone cover can be located behind or in an indicator button located on or in the vicinity of the telephone access door 244. In cases where the emergency phone is replaced by a speaker phone the illumination source can be located in the button 244 which is operable to automatically dial the phone or push it to directly talk without dialing.

Figure 11:
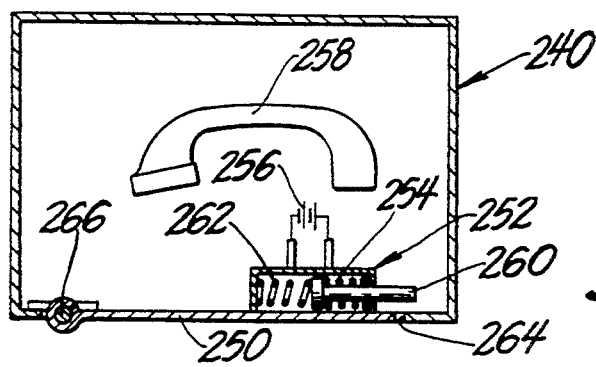
FIG. 11 is an enlarged sectional view taken along the line 10—10 of FIG. 11.

The embodiment of FIG. 11 represents a still further enhancement of the invention shown in FIG. 10. One problem with telephone emergency calling systems is that the telephone is readily accessible and is thereby subject to theft or vandalism. In accordance with the embodiment of FIG. 11, an emergency system is provided which is simpler and less expensive than speaker phone systems which are often used in place of standard cab phones to prevent access to the telephone. The improved system of this invention enables a standard cab phone to be located in the elevator behind a selectively opened access door 250. The improved system includes a locking latch 252 which is maintained normally locked when the main power is functioning. Under emergency conditions the solenoid 254 for the locking latch 252 is energized by the emergency D.C. power source 256 to release the access door so as to expose a phone handset 258. As shown in FIG. 11, a plunger 260 of the locking latch 252 is spring loaded by a spring 262 to lock against the backside of a side door jamb 264 to prevent the door 250 from being pivoted open about a side hinge 266. In FIG. 11, emergency power is connected by the emergency relay across the wires 268, 269 to energize the solenoid 254 to overcome the force of spring 262 so as to retract the plunger 260 to clear the jamb and thereby allow outward swinging movement of the door 250 about the hinge 266. Once the door 250 is opened the phone is accessible for communicating the emergency. As in the previous embodiment a flashing LED 270 can be provided on the door 250 to call attention to the location of the door 250 for opening it once the plunger is retracted.

An emergency light also can be provided within the phone compartment. It illuminates when the emergency power source is connected so as to draw an occupant's attention to the phone. If desired the emergency light can be of the flashing variety to provide still further attention.

What is claimed is:

1. In a lighting system having a primary lighting means including a main power supply and an emergency lighting means including a d.c. power supply and a test point for measuring the emergency lighting means when the primary lighting means has failed the improvement comprising:

the test point located below the ceiling and to one side of a vertical wall disposed below the ceiling;

a dual light source located vertically above the test point; said dual light source directly exposed to said test point;

said dual light source including a first light connected to said main power supply to direct light energy into the space surrounding the test point when said main power supply is energized;

said dual light source further including a second light connected to said d.c. power source and operative when said first light is deenergized because of main power supply failure to direct light energy into the space surround the test point to an illumination level sufficient to meet minimum emergency lighting standards; and a control panel on said vertical wall; an alarm device on said control panel; and a light on said control panel housing for illuminating said alarm device when said first lamp is deenergized because of main power failure to provide a greater illumination level than that required to meet minimum emergency lighting standards.

2. An emergency lighting system for an elevator cab having a ceiling, a control panel on a vertical wall thereof, a primary power sources a battery power source, and the control panel normally illuminated by a first light when the primary power source is operative and illuminated by a second light located vertically above the control panel substantially at the ceiling when said primary power source is inoperative and when said battery power source is connected to the second light characterized by:

an alarm device spaced from the ceiling and operatively associated with the control panel housing; and a third light operatively associated with the control panel for focusing light against the alarm device when the primary power source is inoperative thereby enabling an occupant to locate and operate the alarm device during failure of said primary power source.

3. The emergency lighting system of claim 2 further comprising:

said alarm device including an alarm button and an alarm system connected to said alarm button and response to operation of said alarm button; said third light directly illuminating said alarm button during primary power failure.

4. An emergency lighting system for an elevator cab having a control panel on a vertical wall thereof, a primary power source, a battery power source, and the control panel normally illuminated by a first light when the primary power source is operative and illuminated by a second light located vertically above the control panel when said primary power source is inoperative and when said battery power source is connected to the second light characterized by:

an alarm device operatively associated with the control panel housing; and a third light operatively associated with the control panel for focusing light against the alarm device when the primary power source is inoperative thereby enabling an occupant to locate and operate the alarm device during failure of said primary power source;

said alarm device including an alarm button and an alarm system connected to said alarm button and responsive to operation of said alarm button; and said third lamp directly illuminating said alarm button during primary power failure, said third light comprising phosphorescent material surrounding said alarm button and operative to illuminate said alarm button during primary power failure.

5. The emergency lighting system of claim 2 further comprising:

said third light comprising a light emitting diode.

6. The emergency lighting system of claim 2 further comprising;

said alarm device including a telephone indicator button associated with a telecommunication system; said third light directly illuminating said telephone indicator button during primary power source failure.

7. An emergency lighting system for an elevator cab having a control panel on a vertical wall thereof, a primary power source, a battery power source, and the control panel normally illuminated by a first light when the primary power source is operative and illuminated by a second light located vertically above the control panel when said primary power source is inoperative and when said battery power source is connected to the second light characterized by:

an alarm device operatively associated with the control panel housing; and a third light operatively associated with the control panel for focusing light against the alarm device when the primary power source is inoperative thereby enabling an occupant to locate and operate the alarm device during failure of said primary power source;

said alarm device including a telephone indicator button associated with a telecommunication system; said third light directly illuminating said telephone indicator button during primary power failure, and said third light comprising phosphorescent material surrounding said telephone indicator button and operative to illuminate said telephone indicator button during primary power failure.

8. The emergency lighting system of claim 6 further comprising:

said third light comprising a light emitting diode operative to illuminate said telephone indicator button during primary power source failure.

9. In a lighting system having a primary lighting means and an emergency lighting means for an elevator having a ceiling, a side wall having a control panel with emergency equipment on or adjacent the control panel and a test point at which the illumination of the emergency lighting means is measured when the primary lighting means has failed the improvement comprising:

a main power supply;

the test point being located below the ceiling and spaced from the side wall;

the emergency lighting means comprising a downlighting fixture located substantially at the ceiling and including plural in line lamps including a lens end thereon, and a battery for energizing said plural in line lamps only when said main power supply fails whereby said plural in line lamps direct light energy downwardly from said downlighting fixture for providing light energy on the test point to an illumination level sufficient to meet minimum lighting standards for operating the emergency equipment while providing general illumination to the elevator cab.

10. In the lighting system of claim 9, said plurality of lamps including first, second and third lamps each of said first, second and third lamps including a lens end thereon and said battery energizing said first, second and third lamps only when said main power supply fails whereby said first lamp and said second and third lamps provide light energy on the test point to an illumination level sufficient to meet minimum lighting standards for operating the emergency equipment on or adjacent the control panel while providing general illumination to the elevator cab.

11. In a lighting system having a primary lighting means and an emergency lighting means for an elevator having a ceiling, a side wall having a control panel with an emergency button and a test point at which the illumination of the emergency lighting means is measured when the primary lighting means has failed the improvement comprising:
  a main power supply;
  the test point being located below the ceiling and spaced from the side wall;
  a first lamp including a lens end thereon and a battery for energizing said first lamp only when said main power supply fails whereby said first lamp directs light energy on the test point;
  second and third lamps lined up with said first lamp; each of said second and third lamps also including a lens end thereon and said battery energizing said second and third lamps only when said main power supply fails whereby said first lamp and said second and third lamps provide light energy on the test point to an illumination level sufficient to meet minimum lighting standards for operating the emergency button on the control panel while providing general illumination to the elevator cab.

* * * * *